United States Patent [19]

Hoogeboom

[11] 3,933,730
[45] Jan. 20, 1976

[54] THERMALLY STABLE TRANSLUCENT POLYCARBONATE COMPOSITION

[75] Inventor: Thomas J. Hoogeboom, Evansville, Ind.

[73] Assignee: General Electric Company, Pittsfield, Mass.

[22] Filed: Aug. 9, 1974

[21] Appl. No.: 496,129

[52] U.S. Cl. ............................ 260/37 PC; 260/824
[51] Int. Cl.$^2$ ........................................ C08L 69/00
[58] Field of Search ..................... 260/37 PC, 824

[56] References Cited
UNITED STATES PATENTS 2,999,835  9/1961  Goldberg .................. 260/824 R X
3,360,498  12/1967  Rawlings ..................... 260/37 PC X

*Primary Examiner*—Lewis T. Jacobs
*Attorney, Agent, or Firm*—Donald M. Papuga; William F. Mufatti

[57] ABSTRACT

A thermally stable translucent polycarbonate composition comprising in admixture an aromatic carbonate polymer and a minor amount of a mixture of a poly(-dimethylsiloxane) gum and divided silica.

3 Claims, No Drawings

THERMALLY STABLE TRANSLUCENT POLYCARBONATE COMPOSITION

This invention is directed to a thermally stable translucent polycarbonate composition comprising, in admixture, an aromatic carbonate polymer and a minor amount of a mixture of a poly(dimethylsiloxane) gum and finely divided silica.

BACKGROUND OF THE INVENTION

Translucent polycarbonate resin may be manufactured for internally illuminated signs, protective light diffusers for fluorescent, incandescent or gaseous discharge lamps, translucent window lights, and the like.

It is known in the art that polycarbonate resins may be rendered translucent by the use of one or more inorganic additives such as titanium dioxide, zinc oxide, lead carbonate, lithopone, talc, etc., either alone or in combination. All of these inorganic salts produce translucent formulations which are deficient in one or more properties. At the high temperatures normally encountered during the manufacturing process, many of these inorganic light diffusers are chemically reactive and degrade the desirable physical and optical properties of the polycarbonate composition.

In making a tranlucent formulation, many variables are to be considered: e.g., the color of the light reflected from the surface of a molded part; the color and intensity of the light transmitted through the molded part; and in particular, the radial energy distribution of light transmitted through a molded part from a parallel beam of light. An ideally diffuse test piece, when illuminated by a narrow, parallel beam of light, will exhibit a spherical energy distribution on the side opposite the impinging beam, a property especially important when it is desired to obscure the light source and present a uniformly illuminated surface. The more this distribution departs from the spherical (that is, the greater the proportion of light propagated straight through the part in the same direction as the impinging beam), the less ideal is the test part as a diffuser.

This property of a light diffuser can be measured conveniently on a G.E. Recording Spectrophotometer by measuring the diffuse light ($T_d$) transmitted through a sample, the portion which is transmitted undiffused in the same direction as the impinging beam being absorbed by a black velvet light trap placed in the external sample part, and comparing it with the total light ($T_t$) transmitted through the sample. The ratio $T_d/T_t$ is called the diffusivity, D, of the sample. The closer this ratio is to 1.0, the more closely the sample approaches an ideal diffuser.

In addition, the translucent composition must be thermally stable and easily processable.

DESCRIPTION OF THE INVENTION

It has been surprisingly discovered that a thermally stable translucent polycarbonate composition results by admixing a minor amount of a mixture of a poly(dimethylsiloxane) gum and finely divided silica. This composition possess at once a high diffusivity and transmissivity.

The poly(dimethylsiloxane) gum of the instant invention has a molecular weight of between 50,000 to about 500,000 grams/mole, preferably between 200,000 and 300,000 grams/mole, and may contain minor amounts of phenyl and/or vinyl groups. This gum may be prepared by methods set forth in U.S. Pat. Nos. 2,445,794; 2,448,756; 2,484,595; and 3,314,424.

The silica of the instant invention has a high surface area in the range of 50 - 380 $cm^2/g$, preferably 185 - 225 $cm^2/g$. It may be pretreated with silanes, or siloxanes, preferably, octamethylcyclotetrasiloxane to reduce its hydrophilicity and increase the ease with which it may be blended with the gum.

The ratio of the mixture of silica to poly(dimethylsiloxane) gum is not critical and can range from about 30 to about 120 parts of silica to 100 parts of gum.

The amount of the mixture which can be used ranges from about 0.01 to about 5.0 weight percent based on the weight of the polycarbonate composition.

The ingredients act in a synergistic fashion. Thus poly(dimethylsiloxane) gum by itself gives a composition which, while translucent, is thermally unstable and difficult or impossible to process. Silica, having a refractive index very close to polycarbonate resin, gives a formulation which is nearly transparent. But the poly(dimethylsiloxane) gum dispersed on the silica gives a thermally stable translucent formulation.

The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl), heptane, 2-2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3-5-dichloro-4-hydroxyphenyl) ether, etc.; dihydroxydiphenyls such as p,p'-dihydroxydiphenyl), 3,3'dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc., and dihydroxy diphenyl sulfoxides such as bis(4-hydroxyphenyl) sulfoxides, bis(3,5-dibromo-4-hydroxyphenyl) sulfoxide, etc. A variety of additional dihydric phenols are also available to provide carbonate polymers and are disclosed in U.S. Pat. Nos. 2,999,835; 3,028,365 and 3,153,008. Also suitable for preparing the aromatic carbonate polymers are copolymers prepared from any of the above copolymerized with halogen-containing dihydric phenols such as 2,2-bis(3,5 -dichloro-4-hydroxyphenyl) propane, 2,2-bis(3,5-dibromo-4-hydroxyphenyl) propane, etc. It is of course possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which may be employed in carrying out the process of this invention include phenol, cyclohexanol, methanol, para-tertiarybutylphenol, para-bromophenol, etc. Preferably phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkali earth metal.

Obviously other materials can also be employed with the aromatic carbonate polymer of this invention and include such materials as anti-static agents, colorants, mold release agents, thermal stabilizers, ultraviolet light stabilizers, reinforcing fillers and the like.

The composition of this invention is prepared by first dispersing the poly(dimethylsiloxane) gum on the silica. This synergistic blend is then admixed with the aromatic carbonate polymer.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

A mixture of 50g of high-surface-area silica treated with octamethylcyclotetrasiloxane to reduce its hydrophilicity and 100g of poly(dimethysiloxane) gum (molecular weight ~ 200,000) were blended together in a high-shear mixer until a uniform blend of the consistency of flour was formed. One hundred parts of an aromatic polycarbonate, prepared by reacting 2,2-bis(4-hydroxyphenyl) propane (hereinafter referred to as bisphenol-A) and phosgene in the presence of an acid acceptor and a molecular weight regulator and having an intrinsic viscosity of 0.57 dl/g is mixed with 0.5 parts of the poly(dimethylsiloxane) gum/silica blend. The resulting mixture is then fed to an extruder, which extruder is operated at about 265°C, and the extrudate is comminuted into pellets. The pellets are then molded into test specimens 2 in. by 3 in. by 0.062 in., using conventional molding techniques. The optical properties of the test specimen were measured with a G.E. Recording Spectrophotometer as described above. The results are set forth in the Table.

EXAMPLE II

One hundred (100) parts of poly(bisphenol-A) carbonate as described in Example I are mixed with 0.33 parts of poly(dimethylsiloxane) gum (molecular weight ~ 200,000) in a high-shear blender. Extrusion of this mixture was extremely difficult, and molding of the extrudate resulted in a thermally unstable, mottled test specimen.

EXAMPLE III

Example II is repeated except that 0.17 parts of high-surface-area silica is used instead of the poly(dimethylsiloxane) gum. The mixture is processed into test specimens as in Example I. The optical properties, measured as in Example I, are set forth in the Table.

EXAMPLE IV

Example II is repeated except that 0.53 parts of titanium dioxide pigment is used in place of the poly(dimethylsiloxane) gum. The mixture is processed into test specimens as in Example I. The optical properties, measured as in Example I, are set forth in the Table.

EXAMPLE V

Example IV is repeated except that 0.09 parts of titanium dioxide pigment is used instead of 0.53 parts. The mixture is processed into test specimens as in Example I. The optical properties, as measured in Example I, are set forth in the Table.

TABLE

| EXAMPLE | $T_d(\%)$ | $T_t(\%)$ | $D (T_d/T_t)$ |
|---------|-----------|-----------|---------------|
| I       | 63.77     | 69.27     | 0.921         |
| III     | 7.97      | 86.22     | 0.092         |
| IV      | 48.29     | 52.37     | 0.922         |
| V       | 38.10     | 69.15     | 0.551         |

It is evident from the Examples that a mixture of poly(dimethylsiloxane) gum and an aromatic polycarbonate resin is very difficult to process and the resulting product is thermally unstable; that a mixture of silica and an aromatic polycarbonate resin is nearly transparent and has a very low diffusivity; but that a mixture comprised of poly(dimethylsiloxane) gum dispersed on high-surface-area silica and an aromatic polycarbonate resin is readily processed into translucent articles of good thermal stability which have a high total light transmission and also a high diffusivity.

It is also evident that the diffusivity of the mixture can be matched by using a suitable concentration of titanium dioxide pigment, but only at the expense of total light transmission; while the transmission can only be matched with a corresponding loss of diffusivity.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A thermally stable translucent polycarbonate composition comprising in admixture, an aromatic carbonate polymer and from 0.01 to about 5.0 weight percent based on the weight of the polycarbonate composition of a mixture of a poly(dimethylsiloxane) gum and finely divided silica having a surface area in the range of 50 to 380 cm$^2$/g; wherein the mixture of poly(dimethylsiloxane) gum and finely divided silica is present in a ratio of from about 30 to about 120 parts of the silica to 100 parts of the poly(dimethylsiloxane) gum.

2. The composition of claim 1 wherein the aromatic carbonate polymer is the reaction product of 2,2-bis(4-hydroxyphenyl) propane.

3. The composition of claim 1 wherein the poly(dimethylsiloxane) gum has a molecular weight of between 50,000 to about 500,000 grams/mole.

* * * * *